(12) United States Patent
Dräger et al.

(10) Patent No.: US 7,696,255 B2
(45) Date of Patent: Apr. 13, 2010

(54) PROCESS FOR THE RECYCLING OF PLASTICS

(75) Inventors: Richard Dräger, Saarwellingen (DE); Ulrich Schurr, Lebach (DE)

(73) Assignee: Wietek Holding GmbH, Nohfelden-Eisen (DE)

( * ) Notice: Subject to any disclaimer, the term of this patent is extended or adjusted under 35 U.S.C. 154(b) by 0 days.

(21) Appl. No.: 11/997,574

(22) PCT Filed: Jul. 28, 2006

(86) PCT No.: PCT/EP2006/064772

§ 371 (c)(1),
(2), (4) Date: Feb. 1, 2008

(87) PCT Pub. No.: WO2007/014907

PCT Pub. Date: Feb. 8, 2007

(65) Prior Publication Data

US 2008/0234399 A1    Sep. 25, 2008

(30) Foreign Application Priority Data

Aug. 1, 2005    (EP) ............................. 05107097.7

(51) Int. Cl.
*C08J 11/04*    (2006.01)
(52) U.S. Cl. .............................. 521/40; 264/13; 264/204
(58) Field of Classification Search ............... 425/90; 521/40, 46.5, 47, 48, 48.5, 60, 61, 142, 146; 264/204, 207, 307; 526/348; 210/634, 635; 165/158, 81, 163; 524/389, 543, 464, 577; 427/487, 373
See application file for complete search history.

(56) References Cited

U.S. PATENT DOCUMENTS 5,104,492 A * 4/1992 King et al. ..................... 203/15
5,824,709 A * 10/1998 Suka ............................ 521/47

FOREIGN PATENT DOCUMENTS

DE    198 29 898 A1    1/2000
WO    02/31033 A2    4/2002

OTHER PUBLICATIONS

International Search Report of PCT/EP2006/064772 filed Jul. 28, 2006, date of mailing Oct. 6, 2006.

* cited by examiner

*Primary Examiner*—Ling-Siu Choi
*Assistant Examiner*—Frances Tischler
(74) *Attorney, Agent, or Firm*—Young & Thompson

(57) ABSTRACT

Process for recycling soluble or dispersible plastics from a waste product containing plastics by treatment with an organic solvent, concentrating the plastics solution thus obtained to more than 40 wt % of plastics, preconditioning the concentrated plastics solution to a pressure of at least 2 bar using a first pump and a temperature of 1-10° C. below the boiling temperature of the solvent at that pressure, bringing this preconditioned concentrated plastics solution above the critical point of the plastics solution using a high-pressure pump and a high-pressure heat exchanger, spraying the concentrated plastics solution above the critical point to recover the plastics through evaporation of the organic solvent, and recovery of the organic solvent. The process has advantages over known processes in that higher concentrations of plastics can be processed, without the danger of cavitations, and the need for solvent and energy can be reduced.

18 Claims, 1 Drawing Sheet

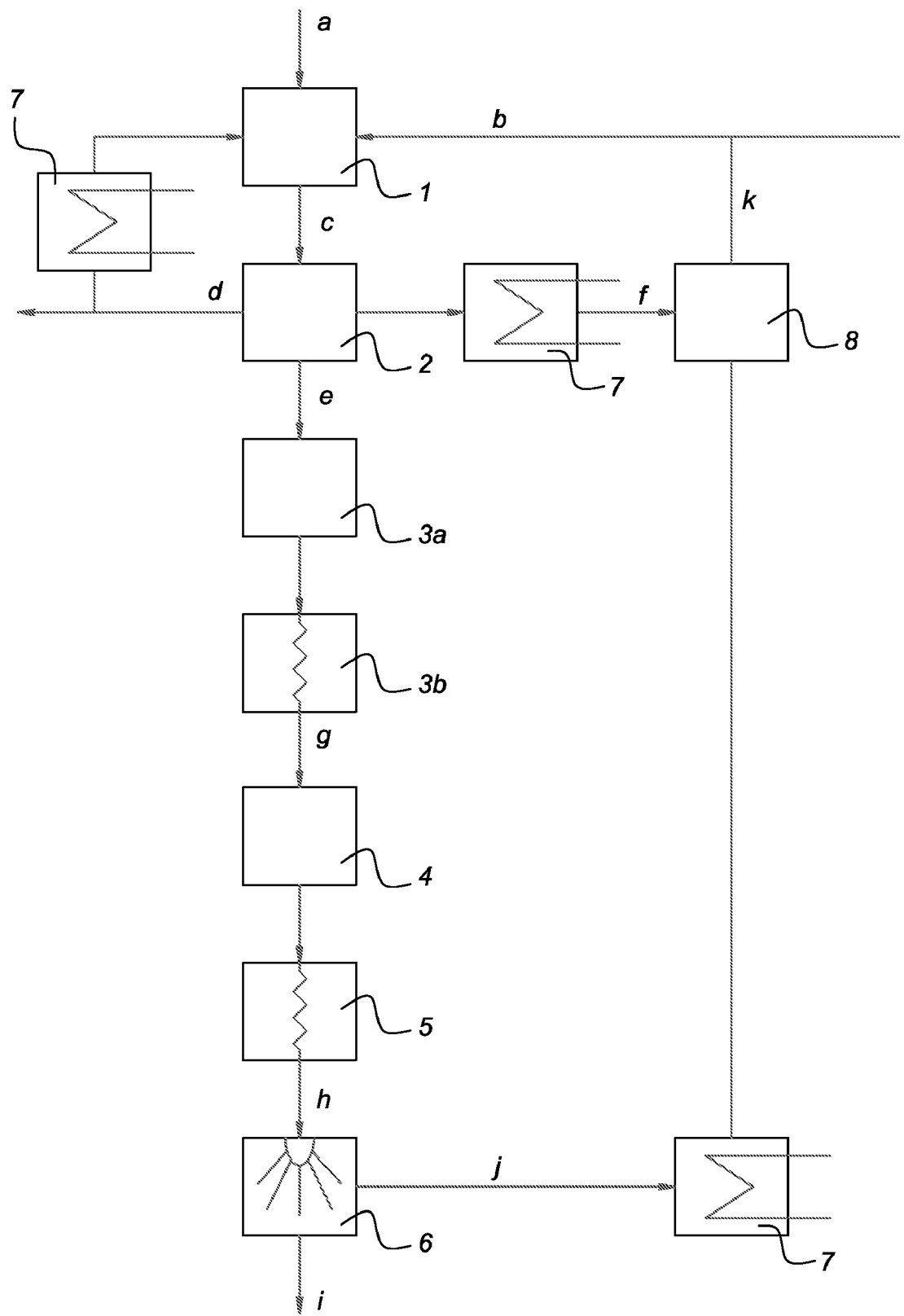

PROCESS FOR THE RECYCLING OF PLASTICS

FIELD OF THE INVENTION

The invention relates to a process for recycling soluble or dispersible plastics from a waste product containing plastics.

TECHNICAL BACKGROUND

It is common knowledge that most plastics are soluble or dispersible in organic solvents. This feature is often applied in the regeneration of plastics from products consisting of different materials, in particular from waste products. With the environmental awareness recycling of plastics has attracted many attention, making use of the solvability properties of the plastics to selectively separate them from waste.

In the prior art the general idea is that the plastics are first removed from the product by mixing the product with a solvent able to dissolve or disperse the plastics. The plastics are then recovered in the form of a residue obtained by removing the solvent component from the plastics. Direct heat application to evaporate the solvent from the plastics disadvantageously yields plastics recyclates with considerable remainders of solvent, and the extensive heat load results in inferior recyclate properties.

It is known in the art that with coagulation methods often lower residual contents can be established. An example hereof is given by DE-A40 33 604, wherein a mixture of plastics and solvent is introduced in a heated coagulation bath; the following heat exchange between non-solvent and solvent results in the evaporation of the solvent and reclamation of the plastics. A drawback of the coagulation method is that the plastics then need to be freed from the coagulation medium, the method involving an additional drying step.

Moreover, these techniques often do not recover important additives in the plastics, such as the softeners in soft PVC, therewith leaving the end product with totally different—and unwanted—properties.

Alternatively, WO-A-02/31033 teaches a polystyrene reclamation process wherein waste polystyrene-type materials are dissolved in a reusable low-boiling polystyrene solvent, and wherein the solution of polystyrene-type material after concentration is devolatilised by extrusion at a temperature less than 190° C. The process involves a preheating step, in which the temperature is controlled to superheat the solution to 125-150° C., therewith enhancing evaporation. The additional evaporation step is required to concentrate the polystyrene solution to an extrudable viscosity range. Secondly, it is long known that extrusion in itself does not give satisfactory solvent evaporation, since the surface area available for evaporation in extrusion is limited. It is exactly for this reason that shearing is applied.

WO-A-02/31033 exemplifies a concentrated 33 wt % polystyrene solution, hours-lasting run times and recovery rates of 3.5-12 lbs/hr. The presence of volatiles in the recycled product may be reduced to less than 0.5%. The temperature is controlled to below 150° C. during preheating and lower than 190° C. in order to minimise the effect of heat on polymer quality. Even then, because of extended processing times, the heat loads still result in a dramatic loss of recyclate properties, especially severe molecular weight degradation. Another disadvantage of the energy-consuming extrusion process is that it is limited to a small viscosity range.

The problems existing in the art are advantageously solved by the process as disclosed in DE-A-198 29 898 A yield of reclamated plastics with a solvent content of less than 0.5 wt % is obtained even without the application of a coagulation bath. The process according to DE-A-198 29 898 comprises the above-described step of mixing waste with an organic solvent. However, instead of coagulation or extrusion, the mixture of plastics and solvent is subsequently sprayed at conditions above the temperature required to evaporate all of the solvent present. Upon spraying the overheated solvent evaporates from the optimally extended polymer solution-air interface, far more efficient that extrusion.

However, the process according to DE-A-198 29 898 is only applicable to low-viscous solutions having a plastics content of less than 40 wt %, comparable to those reported in connection to extrusion. At higher concentrations cavitations occur and a continuous throughput, especially not at high-pressure, is no longer guaranteed. Obviously, the restriction to low plastics concentrates and therewith related additional evaporation and condensation steps decrease the process efficiency, and increases the degradation of the recycled plastics, due to the prolonged and higher heat load.

In addition, with mixing techniques commercially available in the art it is only possible to separate plastics from waste in concentrations of about 10-15 wt %. It is mentioned in DE-A-198 29 898 that the separated plastics need to be concentrated to achieve 20-40 wt % throughput in the rest of the process. In WO-A-02/31033 this is achieved by the preheating step. Disadvantageously, such inefficient mixing results in high solvent and energy demands, also because of the limited energy capacity of a low plastics concentration.

Finally, the reclamation processes in the art, including the process according to DE-A-198 29 898, are disadvantageously affected by water accumulation in the solvent. Hence, the products need to be dried prior to submittal to the recycling process and the water-contaminated solvent is subjected to an additional cleansing step before it can be reused.

It is therefore an aim of the invention to provide a process for recycling plastics from waste material with an increased yield of plastics, wherein higher concentrations of plastics can be handled and wherein water contamination of the separated plastics and the applied organic solvents can be maintained at low levels.

SUMMARY OF THE INVENTION

The inventors have now found that the shortcomings of the prior art can be overcome using the following process for recycling soluble or dispersible plastics from a waste product containing plastics:

i. treating a plastics-containing waste product with an organic solvent to separate the plastics from the waste product as a plastics solution;

ii. concentrating said plastics solution to obtain a concentrated plastics solution containing more than 40 wt % of plastics;

iii. preconditioning said concentrated plastics solution to a pressure of at least 2 bar using a first pump 3a and a heat exchanger 3b, and a temperature of 1-10° C. below the boiling temperature of the solvent at that pressure;

iv. bringing the preconditioned concentrated plastics solution above the critical point of the plastics solution using a high-pressure pump 4 and a high-pressure heat exchanger 5;

v. spraying the concentrated plastics solution above the critical point into a plastics recovery unit 6, to recover the plastics through evaporation of the organic solvent; and vi. transferring the evaporated organic solvent to a condensing unit 7 to recover the organic solvent.

Where "plastics solution" is mentioned, it is understood to comprise suspensions of plastics.

With the preconditioning step, wherein the concentrated and viscous plastics solution is prepressurised and heated to a temperature close to the boiling temperature it is possible to obtain a continuous throughput of high plastics concentrations, much higher than achieved in the art, and without the danger of cavitations. It is found that these high concentrations of plastics can only be processed using a standardised industrial high-pressure pump 4 when submitted to such a preconditioning step. With the higher plastics throughput the process advantageously decreases the need for solvent and energy.

The preconditioning step in the context of the invention is not to be confused with the preheating step in relation with extrusion. Whereas superheating the solution prior to extrusion, as for instance taught in WO-A-02/31033, is deemed necessary to produce an extrudable solution and to aid the less effective evaporation achieved by extrusion, in the preconditioning step evaporation of solvent is avoided. During this treatment, the plastics solution is stored with sufficient energy to evaporate the solvent later on, only in a subsequent spraying step. By doing so, less heat is required than by continuously heating the solution to achieve evaporation. This results in a positive effect on the quality of the end product.

A skilled person, aware of the problem of making the recycling process of DE-A-198 29 898 more efficient, less energy-consuming, would not contemplate the preheating step to make up for the inefficient evaporation rate in subsequent extrusion taught in WO-A-02/31033, as the additional evaporation step would only require more energy and have a detrimental effect on the quality of the end product.

The term "critical point" corresponds to the amount of energy necessary to evaporate all solvent present in the solution, which is the mass of the solvent to be evaporated times its evaporation energy. This amount of heat has to be provided for by the energy content of the solution, which is the total mass of the solution times the specific heat capacity of the solvent times the raise in temperature. Hence, the temperature in step iv) needs to be at least the solvent evaporation temperature at the pressure of the system plus the above-defined temperature raise. The critical point in the context of the invention is not to be confused with the point of coincidence of the gas and liquid phases in a single fluid phase, sometimes referred to in the literature. The present definition of the critical point is adapted to the literature cited herein.

With the term "plastics" it is understood polymeric material and all inorganic and organic materials related therewith, such as additives, fillers, pigments, lubricants, softeners and other property improvers commonly applied in polymeric applications. With "recycled plastics" in the context of the invention it is meant to include those additives that give the plastics their favourable physical properties, in contrast to recycling methods taught in the art. The plastics comprising polymers and related (in)organic matter will be addressed hereinafter as "energy carriers".

In addition, another advantage of the higher throughput of these plastics is the optimisation of energy transfer during heat exchange: the high amount of energy carriers promote the uptake of energy by the solvent such that less energy (based on the total mixture) is required to reach a certain solvent evaporation rate. For every additional 10 wt % of inorganic and organic matter in the plastics solution the energy source temperature can beneficially be lowered by more than 25° C. during heat exchange. Moreover, the resulting lower temperature and heating times improve the quality of the recycled polymeric material and decrease molecular weight degradation.

Moreover, related to the higher plastics throughput and energy transfer optimisation, processing times of 1-10 kg/min of recycled plastics are easily obtained with the present invention, which is far higher than realised by for instance coagulation or extrusion.

LIST OF FIGURES

The FIGURE shows a schematic flow diagram of the recycling process according to one embodiment of the invention, optionally comprising a water-removing means to reduce the water content of the recycled solvent.

DETAILED DESCRIPTION OF THE INVENTION

The FIGURE shows a flow diagram of the recycling process of the invention, involving a mixing unit 1, a concentration unit 2, a first pump 3a and heat exchanger 3b, a second pump 4, a heat exchanger 5, a plastics recovery unit 6 and condensation units 7. Optionally, the process of the invention further involves the use of a water-removing means 8.

With the terms "mixing" and "dissolving" as used throughout the present description and claims is meant that a plastic is separated from waste material containing it using an organic solvent. Separation can be achieved by dissolution or dispersion of the plastics in an organic solvent. If a dispersion of plastics is formed, the organic solvent acts as a dispersing agent. Thus, "plastics solution" is also meant to comprise dispersions of plastics.

The waste material a can comprise various kinds of products, either of industrial or household (post consumer) origin, and it can be any combination of polymeric material with e.g. metallics. Examples hereof are old parts or production waste from the automobile industry or its suppliers, parts of house hold machines, communication devices, computers or other electronic machinery, and packaging materials.

It is preferred that the waste material submitted to the mixing unit 1 contains large amounts of plastics, preferably at least 60%, more preferably at least 80% of the total dry weight of the waste material. The plastics comprise large amounts of polymers. The terms "polymers" and "polymeric material" as used throughout the application are interchangeable and are understood to comprise one or more homopolymers or copolymers of any molecular weight and distribution.

Preferably a large part of the polymeric material is amorphous, and more preferably the plastics comprise one or more homo- and copolymers selected from the group of polystyrene (PS), acrylonitrile-butadiene-styrene (ABS), styrene-acrylonitrile (SAN), acrylate-styrene-acrylonitrile (ASA), polymethylmethacrylate (PMMA), soft polyvinyl chloride (PVC) and polyolefines such as polyethylene (PE) and polypropylene (PP).

However, the process is not limited to the herementioned waste products and polymers, but can be applied for the recovery of all kinds of plastics from various plastic-containing products, wherein at least a part of the polymeric material in the product can be either dissolved or dispersed in an organic solvent.

Before submittal of the waste material comprising plastics to step i) of the process of the invention it can optionally be sized, e.g. by crushing or grinding, to reduce it to workable dimensions and maximising the contact area with the solvent during mixing.

It is preferred to dry the waste material in a dehydration step before use, in order to maintain low water levels throughout the process and in the end-products. It is preferred that the waste material submitted to step i) of the process contains at most 3 wt % of water, more preferably at most 1 wt %, particularly at most 0.5 wt %, based on the total weight of the waste material. The water present in the waste material can either be residual moisture or ambient moisture originating from e.g. preceding washing steps or from storage in open air.

High amounts of water in the starting products will lead to an accumulation of water in the process, which in turn undesirably affects the quality of mixing and azeotrope formation of solvent, especially in the preferred case of continuous recirculation of the solvent. In addition, water can also change the properties of the recycled polymer, especially when the polymer comprises a large hydrophilic part, e.g. ABS and the like polymers.

After optional sizing, washing and drying steps the waste material is contacted with an organic solvent b. The organic solvent is selected to dissolve or disperse one or more polymers from the products that are submitted to the recycling process. In view of the above, the solvent provided to the separation step i) should comprise less than 2 wt %, more preferably less than 1 wt %, particularly less than 0.5 wt % of water. The separation step can also involve the combined or sequential use of organic solvents.

The choice of organic solvent is dependent on the type of polymer to be extracted from the waste material, which in turn is dependent on the input of waste material. For instance, if the batch of waste products primarily consists of packaging materials, it will contain substantial amounts of polystyrene and/or copolymers thereof and the organic solvent is selected to be one that is a good solvent for styrene, such as toluene, ethylbenzene, MEK etc. Generally, especially preferred are those organic solvents which are biologically degradable, more preferably from the group of ketones, e.g. acetone, methylethylketone.

Mixing is achieved using a mixing unit comprising an agitator or impeller having blades and anchor blades attached thereto, and baffles. It is preferred that the mixing unit is a symmetrically shaped reactor without any sharp-edged corners, said reactor preferably having a cross-section that is substantially round.

The impeller is preferably centrally located along the axis of the mixing unit. Although the impeller can be either an axial flow impeller or a radial flow impeller, differentiating in the angle the blades make with the drive shaft, a radial flow impeller—having blades parallel to the axis of the mixer shaft—is preferred. The impeller preferably comprises 2-6 blades. The span width of the impeller and its blades is preferably between 0.2 and 0.8, preferably at least 0.4 of the mixing unit diameter. The anchor blades near the bottom sweep the entire peripheral area of the bottom, and preferably at least a part of the walls near the bottom of the mixing unit, thus avoiding settling of solid materials at the bottom.

Mixing can involve constant or periodic agitation. The agitation, especially at high speed, leads to the formation of a vortex, often accompanied by air entrainment and an oscillating surge within the unit. The use of baffles overcomes these problems and results in a large amount of turbulent top-to-bottom circulation. Typical baffles are flat vertical strips set radially on the unit wall. The standard baffle width is one-twelfth of the unit diameter. For the agitation of the high-viscosity liquid, baffles are typically set out one-half the width of the baffles from the vessel wall to prevent accumulation of product. There are preferably at least two baffles facing each other. In large mixing units, it is preferred to apply four baffles separated 90° from one another.

The mixing unit as described above enables a continuous turbulent stream to stimulate contact between the organic solvent and the waste product containing plastics. It is possible to heat the mixing unit and its contents by passing a heating medium using a jacket enclosing the mixing unit. The mixing time is typically in the range of 10 to 80 minutes, preferably between 20 and 60 minutes. The actual mixing time is dependent on the size of the waste material submitted to the mixing unit, mainly the extent to which the waste material is pulverised prior to mixing.

The amount of energy carriers or plastics in the plastics solution c is higher than 15 wt %, preferably at least 16 wt %, more preferably at least 20 wt %, and most preferably at least 25 wt % of the weight of the stream. Although it is preferred to separate as much plastics from the waste material as possible, for ease of handling during further separation steps it is preferred that the concentration of plastics is lower than 40 wt %, more preferably lower than 30 wt %. These numbers are based on the total weight of the plastics solution after the substantial removal of non-soluble material but before any following concentration steps. The plastics yield thus obtained is at least a factor two higher than reported in the art.

Obviously, the higher yield of plastics in step i) avoids or at least limits the intermediate energy-consuming concentration step ii). In addition, these larger amounts of energy carriers improves the energy uptake of the mixture of solvent and plastics in the concentration step ii). Accordingly, a reduction of the energy costs is established, and moreover, the quality, e.g. chain length, of the recycled polymeric material is improved.

The treatment in step i) also comprises the removal of non-soluble non-plastic materials d from the mixture of plastics and solvent. This treatment can involve e.g. filtration, magnetic separation and/or the addition of additives, dependent on the kind of other materials present in the waste products. After this treatment, the plastics solution can still contain solid non-plastic material, e.g. metal particles, albeit preferably in amounts less than 5 wt %, more preferably less than 2 wt % of the weight of the plastics solution. The non-plastic material can be discarded or returned to the mixing step.

In the concentration unit 2 the plastics solution is concentrated to more than 40 wt %, preferably 40-60 wt %, more preferably at least 42 wt %, even more preferably at least 45 wt %, most preferably at least 50 wt % of plastics. Accumulation of plastics is achieved by solvent evaporation or membrane technologies known in the art. The concentrated plastics solution e submitted to step iii) preferably contains less than 2 wt %, preferably even less than 1 wt %, most preferably less than 0.5 wt % of water, based on the total weight of the mixture. Optionally, the recovered organic solvent f can be returned to the mixing unit 1, preferably via a water-removing means.

The concentrated plastics solution e is too viscous to handle using conventional high-pressure heat exchange. It is found that the transfer of the concentrated plastics solution can be realised by applying a pre-conditioning step iii) in which the concentrated plastics solution is pressurized to at least 2 bar, preferably between 3-10 bar using a first pump 3 and heated to a temperature of 1-10° C., preferably between 5-10° C. below the boiling temperature of the solvent at that pressure. It is essential for the pump to be able to handle the high-viscosity plastics solutions and guarantee the continuity of the stream of plastics leaving the pump, to avoid cavitations. Thereto, it is preferred that the pump is a piston, plunger or membrane pump, preferably a membrane pump.

In a preferred pre-pressurising first pump 3 for use in the invention the concentrated plastics solution is divided over two sections. The sections are subdivided in two parts by means of membranes. The outer part of each section is the product side, the inner parts are filled with air, and these two inner parts are connected to one another. When the concentrated plastics solution present in one of the section is pumped downstream, the membrane in this section moves outwards, sucks air from the other section, therewith moving the membrane in the other section inwards, upon which movement the outer part of that particular section is filled with concentrated plastics solution again. A control valve realises the air stream moving back and forth between the sections. With such a pump a continuous stream of concentrated plastics solution with elevated pressure is guaranteed, even under high-viscous circumstances.

The preconditioning step iii) enables circuiting mixtures of plastics and solvent having a plastics content of 40-60 wt %, more preferably 42-55 wt %, most preferably less than 50 wt % of plastics, based on the total weight of the mixture, through the remainder of the process.

After the preconditioning step iii) the concentrated plastics solution is brought above the critical point of the plastics solution in step iv). Thereto, the concentrated plastics solution is pumped through the circuit using a second pump 4. This second pump is a high-pressure pump that realises pressures of 100 to 500 bar, preferably 100 to 250 bar, and which pump transfers the pressurized concentrated plastics solution through a heat exchanger, in which the plastics concentration is heated above the critical point of the plastics solution, preferably to a temperature of 100-180° C., preferably 120-170° C., more preferably 140-160° C., all well below the spraying conditions exemplified in DE-A-198 29 898. This combination of temperature and pressure prevents evaporation of the solvent in the pressurised concentrated plastics solution h.

The solution h with high a load of plastics is then sprayed in the plastics recovery unit 6 in step v). The conditions in the plastics recovery unit are below the critical point. Hence, solvent will evaporate from the interface immediately after release of the overheated drops, and because of the extended total area of the drops the evaporation efficiency is far better than achieved when directly heating the mixture of plastics and solvent. The transport of the solvent from within the drop to the interface results in further adiabatic cooling of the plastics. The evaporation process can be further promoted by heating of the walls of the plastics recovery unit. By heating the walls of the plastics recovery unit condensation of the evaporated solvent is avoided.

Therein, the pressure increase which may now be realised in the process up to spraying has in turn a beneficial effect on the actual spraying: a higher pressure at the spraying nozzles produces smaller particles, thus improving evaporation. The pressure at the nozzle is limited by the maximum pump pressure.

The recycled plastics i are collected at the bottom of the unit, said plastics containing less than 0.1 wt %, preferably less than 0.05 wt %, most preferably less than 0.025 wt %, in particular less than 0.01 wt % of organic solvent, based on the total weight of the plastics. Because of the less stringent heating conditions during processing, the recycled plastics obtained according to the process of the invention suffer much less from degradation and closely resemble their original equivalents in terms of chain length. This is in contrast to recycled plastics obtained applying recycling techniques known in the art, where low solvent concentrations can only be realised at the cost of molecular weight degradation, due to an increase in the duration and/or intensity of heating.

With the process of the invention it is possible to obtain recycled plastics that show limited degradation, e.g. an average molecular weight and a melt flow index that differ no more than 10%, preferably less than 5%, most preferably less than 2% of the values for the original plastics provided to the recycling process of the invention.

The evaporated solvent j is collected and transferred to a condensing unit 7, where it is recovered in step v) and preferably returned to step i).

The process can further comprise a step vii) involving the moulding of the recycled plastics, such as granulation, extrusion etc. However, such an extrusion step is not part of the recycling process, but may be performed to bring the recycled plastics, often in the form of a powder, into a more handleable format.

In order to avoid water accumulation and therewith associated problems of loss of solvent quality, azeotrope formation of the solvent and increasing amounts of water in the recycled products, it is preferred that less than 2 wt %, more preferably less than 1 wt %, particularly less than 0.5 wt % of water is present in at least the steps ii)-vi) and more preferably also during step i) of the recycling process, based on the total weight of the liquid in each step.

Besides the aforementioned technical measures to achieve this, the recovered organic solvent obtained from the concentration unit 2 and/or the condensation unit 7, is contacted with a water-removing means 8. The water-removing means can be a membrane or a zeolite. With the water-removing means the water content in the circuit can be maintained at the aforementioned values for water content of the original waste materials and solvent.

The invention thus also relates to polymers recycled according to present invention, particular ABS-recyclates, containing less than 0.1 wt %, preferably less than 0.05 wt %, most preferably less than 0.025 wt %, in particular less than 0.01 wt % of organic solvent, based on the total weight of the recycled polymers. It is preferred that these polymers reclaimed according to the process of the present invention further contain less than 0.5 wt %, more preferably at most 0.1 wt % of water, based on the total weight of the recycled polymer.

EXAMPLES

Example 1

Preparation of ABS-Like Polymer 1500 kg acetone was mixed with 400 kg ABS-containing waste material from the automobile industry in a reactor with an agitation speed of 172 m/min. After mixing, the resulting mixture was filtered over static sieve having 3 mm mesh, a self-cleaning dynamic sieve having 200 μm mesh, and finally a self-cleaning dynamic sieve having 50 μm mesh. About 100 kg of non-soluble material, mostly metallic parts and PP, but also PVC, PUR, POM, was removed this way. The filtrate was continuously pumped through these filters. The concentration of plastics in the filtered medium was about 20 wt %, as determined by measurement of the weight of the filtered plastics solution before and after heating for 30 minutes at 100° C.

The filtered medium was then concentrated to a plastics content of about 50 wt % by spraying it at 500 mbar and at 80° C. into an evacuated container. The concentrated plastics solution was then preconditioned to a pressure of 4 bar using a first pump (Depa DL 40) and heated to a temperature of about 90° C.

With a high-pressure pump (Lewa EH3), the pressure was increased to 150 bar, and pumped through a heat exchanger in which the temperature was increased to 160° C., which is well above the critical point (the point corresponding to the energy required to evaporate all solvent). The amount of energy to be provided was 27.5 kJ (50 kg acetone times its evaporation energy (550 J/kg)). Acetone has a specific heat capacity of about 2 J/kg° C. For ease of calculation, if the total mass of the solution would be 100 kg, a temperature difference of 137.5° C. would thus be required.

The thus obtained solution was pumped at a rate of 250 l per hour to a spraying unit having a spraying cone with spraying angle 90° in a plastics recovery unit having a wall temperature of 80° C. and an underpressure of about 200 mbar. With the boiling temperature of acetone at 200 mbar being about 14° C., a temperature of 151,5° C. would have sufficed in the preceding heating steps to reach the critical point. About 125 kg/h of solid matter was obtained, of which 99.8 wt % ABS recyclate, 0.1 wt % inorganic matter, 0.05 wt % acetone and 0.01% water was obtained.

The evaporated solvent was collected and passed over a zeolite (type Zeosorb 3A S18). About 125 kg/h acetone was recovered, having a water content of less than 0.001 wt %.

Comparative Example I 800 kg ABS-containing waste was divided in two equal parts. 400 kg was treated according to example 1, whereas the other 400 kg was subjected to the recycling process of DE-A-198 29 898, in which the first mixing step with acetone and the following separation including three filtering steps are the same as in example 1. The filtered ABS-containing acetone solution was concentrated to 35 wt %, and pumped to the spraying unit at 200 l/h to a temperature of 230° C. and a pressure of 150 bar using the high pressure pump (Lewa EH3) only, without any preconditioning step. The ABS-recyclate thus obtained contained about 0.5 wt % acetone. Compared to the 50% plastics throughput realised with the process of the invention, the polymer output with the process of the invention was increased by 43%.

The ABS-recyclates obtained according to example 1 and recycled according to the single pump process of DE-A-198 29 898 were then compared in terms of melt flow index, a characteristic measure of the degree of degradation of the polymeric material during the recycling process. The melt flow index was measured according to standardised method ISO 1133 using a MPD (Göttfert GmbH) at a temperature of 220° C. and a weight of 10.0 kg. ABS according to the process of example 1 had a melt flow index at 220° C. of about 14-17 g/10 min, whereas ABS-recyclate prepared without the preconditioning step had a melt flow index of 6-8 g/10 min.

Example 2

Preparation of PS-Like Polymer 400 kg PS-containing refrigerator waste material was mixed with 1500 kg methylethylketone applying conditions similar to those in example 1. Upon filtration 112 kg rest materials, among which metal parts, PP, PUR was separated. The PS concentration in the filtered plastics solution was about 16 wt %, which was then increased to 55 wt %.

In the preconditioning step the pressure and temperature were first increased to 3 bar and 80° C., and in the following step further increased to 150 bar and 150° C., above the critical point (the point required to evaporate all solvent). In this example an amount of energy was required which realises a temperature difference of 112.5° C.

Upon spraying 137 kg/h PS was obtained, having an organic solvent content of less than 0.1 wt % and a water content of about 0.05 wt %, based on the total weight of the PS. About 112 kg/h MEK was recovered. Its water content of 0.26 wt % was reduced to 0.05 wt % bypassing it over zeolite (type Zeosorb 3A S18).

The invention claimed is:

1. A process for recycling soluble or dispersible plastics from a waste product containing plastics comprising:
   i) treating a plastics-containing waste product with an organic solvent to separate the plastics from the waste product as a plastics solution;
   ii) concentrating said plastics solution to obtain a concentrated plastics solution containing more than 40 wt % of plastics;
   iii) preconditioning said concentrated plastics solution to a pressure of at least 2 bar using a first pump (3a) and a heat exchanger (3b), and a temperature of 1-10° C. below a boiling temperature of the solvent at that pressure;
   iv) bringing the preconditioned concentrated plastics solution above the critical point of the plastics solution using a high-pressure pump (4) and a high-pressure heat exchanger (5);
   v) spraying the concentrated plastics solution above the critical point into a plastics recovery unit (6), to recover the plastics through evaporation of the organic solvent; and
   vi) transferring the evaporated organic solvent to a condensing unit (7) to recover the organic solvent.

2. The process according to claim 1, wherein the plastics solution obtained in i) contains higher than 15 wt % of plastics, based on the total weight of the solution.

3. The process according to claim 1, wherein the treatment in i) is performed using a mixing unit (1) comprising an impeller having blades and anchor blades attached thereto, and baffles.

4. The process according to claim 1, wherein the recovered organic solvent is returned to step i)

5. The process according to claim 4, wherein the recovered organic solvent is contacted with a water-removing means (8).

6. The process according to claim 5, wherein the water-removing means (8) is a membrane or a zeolite.

7. The process according to claim 1, wherein less than 2 wt % of water is present in ii)-vi), based on the total weight of the liquid.

8. The process according to claim 5, wherein less than 2 wt % of water is present in ii)-vi), based on the total weight of the liquid.

9. The process according to claim 1, wherein the recycled plastics contain less than 0.1 wt % of organic solvent, based on the total weight of the plastics.

10. The process according to claim 1, wherein the process further involves vii) moulding of the recycled plastics.

11. The process according to claim 1, wherein less than 1 wt % of water is present in ii)-vi), based on the total weight of the liquid.

12. The process according to claim 1, wherein less than 0.5 wt % of water is present in ii)-vi), based on the total weight of the liquid.

13. The process according to claim 1, wherein the recycled plastics contain less than 0.05 wt % of organic solvent, based on the total weight of the plastics.

14. The process according to claim 1, wherein the recycled plastics contain less than 0.025 wt % of organic solvent, based on the total weight of the plastics.

15. The process according to claim 1, wherein the recycled plastics contain less than 0.01 wt % of organic solvent, based on the total weight of the plastics.

16. The process according to claim 1, wherein in the step iii), the pump is a piston, plunger or membrane pump.

17. The process according to claim 1, wherein in the step iii), the pressure is 3-10 bar.

18. The process according to claim 1, wherein in the step iii), the temperature is 5-10° C. below the boiling temperature of the solvent at that pressure.

* * * * *